(12) United States Patent
Pellen

(10) Patent No.: US 8,077,489 B2
(45) Date of Patent: Dec. 13, 2011

(54) SYSTEM AND METHOD OF CANCELLING NOISE RADIATED FROM A SWITCH-MODE POWER CONVERTER

(75) Inventor: Alain T. Pellen, Boca Raton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 829 days.

(21) Appl. No.: 12/121,494

(22) Filed: May 15, 2008

(65) Prior Publication Data

US 2009/0284996 A1    Nov. 19, 2009

(51) Int. Cl.
*H02M 1/12* (2006.01)
*H02M 1/14* (2006.01)

(52) U.S. Cl. ........................... 363/41; 363/39
(58) Field of Classification Search .............. 363/39–48, 363/21.14, 21.15, 56.12; 323/244–246, 282, 323/285, 356

See application file for complete search history.

(56) References Cited

U.S. PATENT DOCUMENTS

| | | | |
|---|---|---|---|
| 2,043,416 A | 6/1936 | Lueg | |
| 2,776,020 A | 1/1957 | Conover et al. | |
| 2,978,577 A | 4/1961 | Ketchledge | |
| 4,025,724 A | 5/1977 | Davidson, Jr. et al. | |
| 4,473,906 A | 9/1984 | Warnaka et al. | |
| 4,584,714 A * | 4/1986 | Fukuhara | 455/297 |
| 4,947,435 A | 8/1990 | Taylor | |
| 4,979,218 A | 12/1990 | Strahm | |
| 5,018,202 A | 5/1991 | Takahashi et al. | |
| 5,170,433 A | 12/1992 | Elliott et al. | |
| 5,315,185 A * | 5/1994 | Usimaru | 327/63 |
| 5,363,451 A | 11/1994 | Martinez et al. | |
| 5,388,160 A | 2/1995 | Hashimoto et al. | |
| 5,394,376 A | 2/1995 | Riddle et al. | |
| H1445 H | 6/1995 | Culbreath et al. | |
| 5,499,301 A | 3/1996 | Sudo et al. | |
| 5,539,832 A | 7/1996 | Weinstein et al. | |
| 5,947,051 A | 9/1999 | Geiger | |
| 6,341,101 B1 | 1/2002 | Dutton et al. | |
| 6,477,066 B2 * | 11/2002 | L'Hermite | 363/41 |
| 6,654,467 B1 * | 11/2003 | York et al. | 381/71.14 |
| 6,850,423 B2 * | 2/2005 | Lanni | 363/21.04 |
| 6,879,500 B2 * | 4/2005 | Liu et al. | 363/40 |
| 7,139,401 B2 * | 11/2006 | Culman et al. | 381/71.7 |
| 7,593,241 B2 * | 9/2009 | Kwon et al. | 363/16 |
| 2005/0144632 A1 * | 6/2005 | Mears et al. | 725/15 |
| 2005/0234715 A1 * | 10/2005 | Ozawa | 704/226 |
| 2006/0038550 A1 * | 2/2006 | Nazarian | 323/315 |
| 2006/0152203 A1 * | 7/2006 | Perry et al. | 323/283 |
| 2007/0103949 A1 * | 5/2007 | Tsuruya | 363/125 |

* cited by examiner

*Primary Examiner* — Jeffrey Sterrett
*Assistant Examiner* — Gary Nash
(74) *Attorney, Agent, or Firm* — Fogg & Powers LLC

(57) ABSTRACT

A switch-mode power converter comprises a converter circuit and an auxiliary switching circuit. The converter circuit comprises a storage component configured to temporarily store input energy; and at least one switch configured to control release of the stored energy from the storage component. The auxiliary switching circuit is coupled to the storage component, the auxiliary switching circuit comprising an auxiliary switch having a duty cycle that is approximately 180 degrees out of phase with the duty cycle of the at least one switch in the converter circuit such that the auxiliary switching circuit produces compensating noise which substantially cancels noise radiated from the converter circuit.

20 Claims, 5 Drawing Sheets

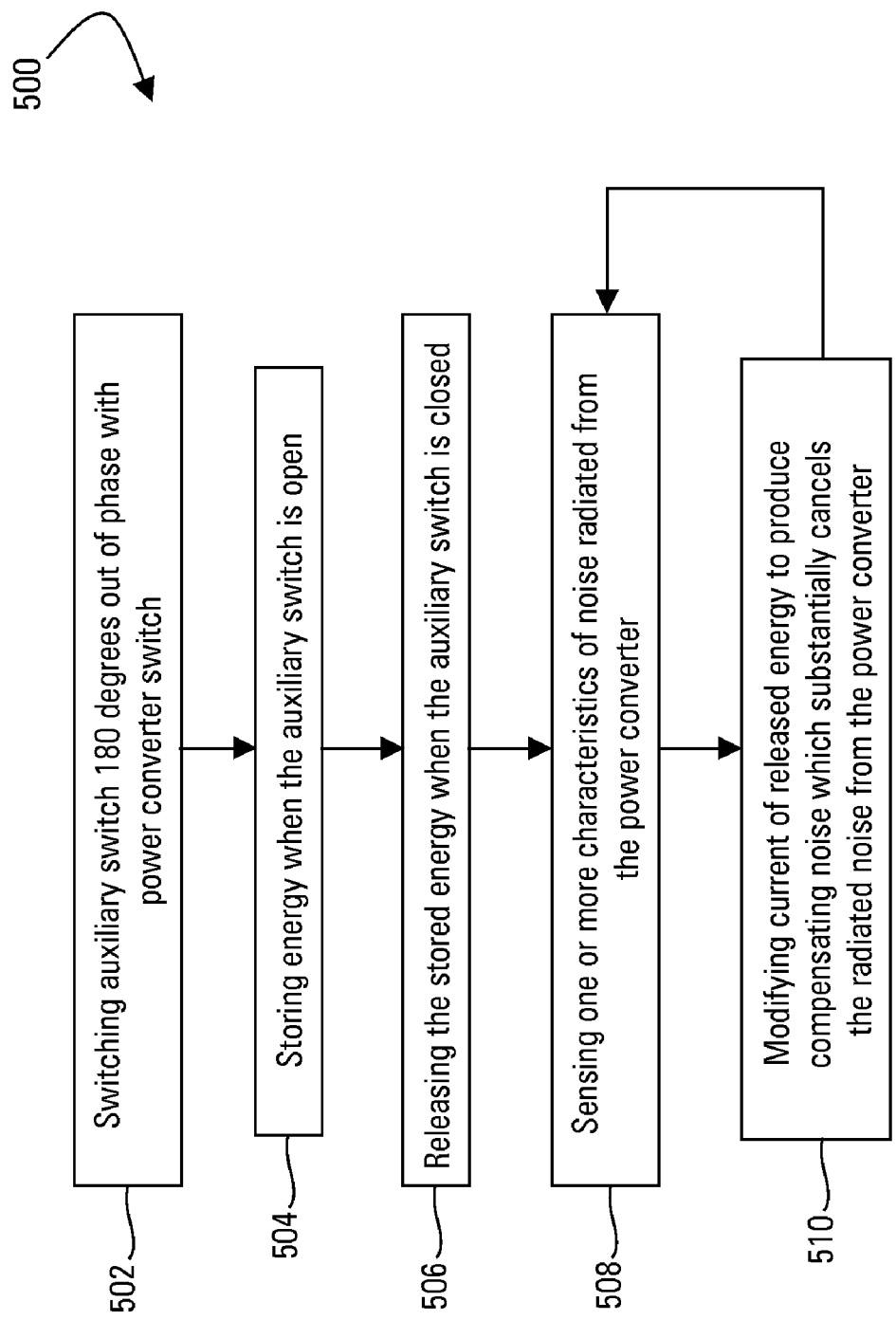

SYSTEM AND METHOD OF CANCELLING NOISE RADIATED FROM A SWITCH-MODE POWER CONVERTER

BACKGROUND

Switch-mode power converters are commonly used in electronic applications to shift direct current (DC) power levels. For example, switch-mode power converters are used in switching power supplies, in AC inverters and pulse width modulated motor controllers. Switching frequency in the range a tens of kilohertz is typically used so the size and weight of magnetic components, such as transformers and inductors, are much smaller than components typically used in linear devices.

However, switch-mode power converters have disadvantages which can make them unsuitable for certain applications. For example, switch-mode power converters can be a source of different types of interference. In particular, electronic noise can be conducted on the output terminals. In addition, the switching action of switch-mode power converters radiates acoustic noise which can interfere with other equipment. Other noise produced by switch-mode power converters includes electromagnetic interference produced by the switching transients. Typical switch-mode power converters attempt to mitigate the effects of generated noise through filters, RF shielding, and/or noise cancellation electronics with digital signal processing algorithms. In the case of submerged applications, where components are maintained at ambient pressure inside an oil pressure balanced enclosure, it is essential to simplify and minimize electronic circuit components to obtain suitable reliability in that type of environment.

For the reasons stated above and for reasons that shall become apparent to one of ordinary skill in the art upon reading and studying the present application, there is a need in the art for a system which effectively cancels radiated noise from a switch-mode power converters.

SUMMARY

The above mentioned problems and other problems are resolved by the present invention and will be understood by reading and studying the following specification.

In one embodiment, a switch-mode power converter is provided. The switch-mode power converter comprises a converter circuit and an auxiliary switching circuit. The converter circuit comprises a storage component configured to temporarily store input energy; and at least one switch configured to control release of the stored energy from the storage component. The auxiliary switching circuit is coupled to the storage component, the auxiliary switching circuit comprising an auxiliary switch having a duty cycle that is approximately 180 degrees out of phase with the duty cycle of the at least one switch in the converter circuit such that the auxiliary switching circuit produces compensating noise which substantially cancels noise radiated from the converter circuit.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which:

FIG. 5 is a flow chart depicting a method of cancelling noise in a switch-mode power converter according to one embodiment of the present invention.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
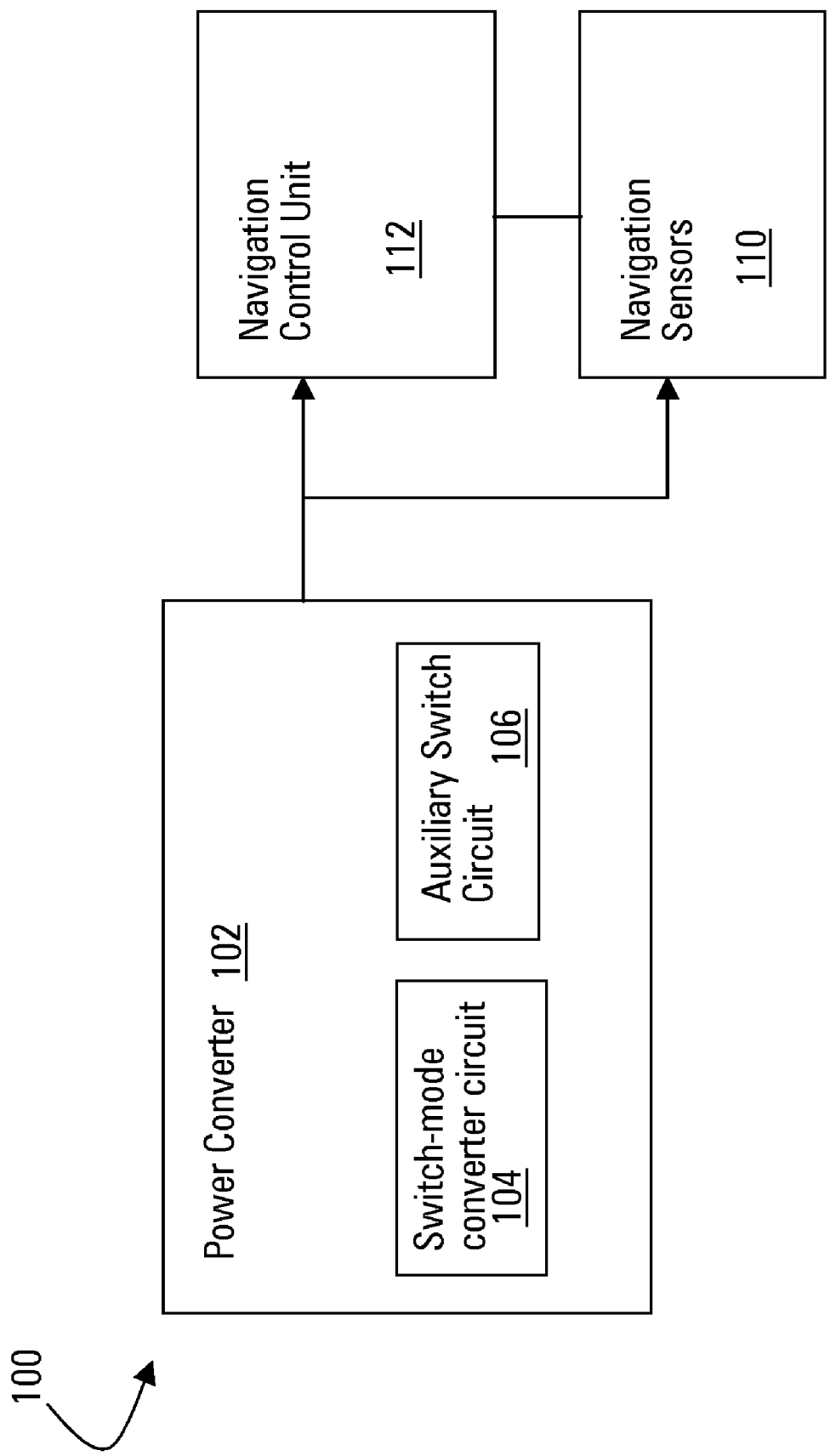
FIG. 1 is a block diagram of a system with an acoustically quiet power converter according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Embodiments of the present invention enable the canceling of radiated acoustic and electromagnetic noise without the need for complex algorithms. In particular, embodiments of the present invention utilize an auxiliary switching circuit which substantially cancels radiated noise. Auxiliary switching circuits of the present invention enable the use of high power switch-mode power converters (e.g. on the order of 20-100 Kilowatts) in submersible devices. In addition, auxiliary switching circuits in some embodiments of the present invention are low power circuits (e.g. on the order of 10 to 100 watts). Notably, although embodiments of the present invention are described with respect to a high frequency DC to DC converter, it is to be understood that any switch-mode power converter can be used in other embodiments.

FIG. 1 is a block diagram of a system 100 with an acoustically quiet power converter 102 according to one embodiment of the present invention. In the example in FIG. 1, system 100 is a navigation system for submerged vehicles. However, it is to be understood that power converter 102 can be used in other systems. Power converter 102 includes a switch-mode converter circuit 104 and an auxiliary switching circuit 106. Auxiliary switching circuit 106 is configured to have a duty cycle which is approximately 180 degrees out of phase with the duty cycle of converter circuit 104. As understood by one of skill in the art, the term "duty cycle" as used herein refers to the proportion of time that a switch is closed to the time it is open. Hence, a switch in auxiliary switching circuit 106 is approximately 180 degrees out of phase with a switch in the converter circuit 104.

Switch-mode converter circuit 104 radiates acoustic noise due to switching during power conversion. This acoustic noise travels long distances when power converter 102 is submerged in a liquid. For example, in a submersible vehicle, the radiated acoustic noise can interfere with other components such as navigation sensors 110. Navigation sensors 110, in this embodiment are implemented as SONAR sensors which uses sound propagation for navigation. However, it is to be understood that other sensors can be used in other embodiments.

In conventional systems, the corrupted sensor data can impair performance of the navigation control unit 112 which receives the corrupted sensor data from navigation sensors 110. However, in system 100, auxiliary switching circuit 106 emulates the acoustic signature of converter circuit 104 to radiate compensating acoustic noise which substantially cancels the noise radiated by converter circuit 104. In particular, auxiliary switching circuit 106 produces an acoustic signature that is approximately 180 degrees out of phase with the noise radiated from converter circuit 104. Exemplary auxiliary switching circuits which radiate compensating acoustic noise are shown and described in relation to FIGS. 2 and 3.

Additionally, in some embodiments, switch-mode converter circuit 104 radiates a magnetic field which introduces electromagnetic interference (EMI) that corrupts other components in system 100 such as navigation sensors 110 and navigation control unit 112. In some embodiments, auxiliary switching circuit 106 is configured to produce a compensating magnetic field signature which is approximately 180 degrees out of phase with the magnetic field radiated from switch-mode converter circuit 104 in order to cancel the EMI produced by converter circuit 104. An exemplary auxiliary switching circuit which produces a compensating magnetic field signature is shown and described in relation to FIG. 4.

Figure 2:
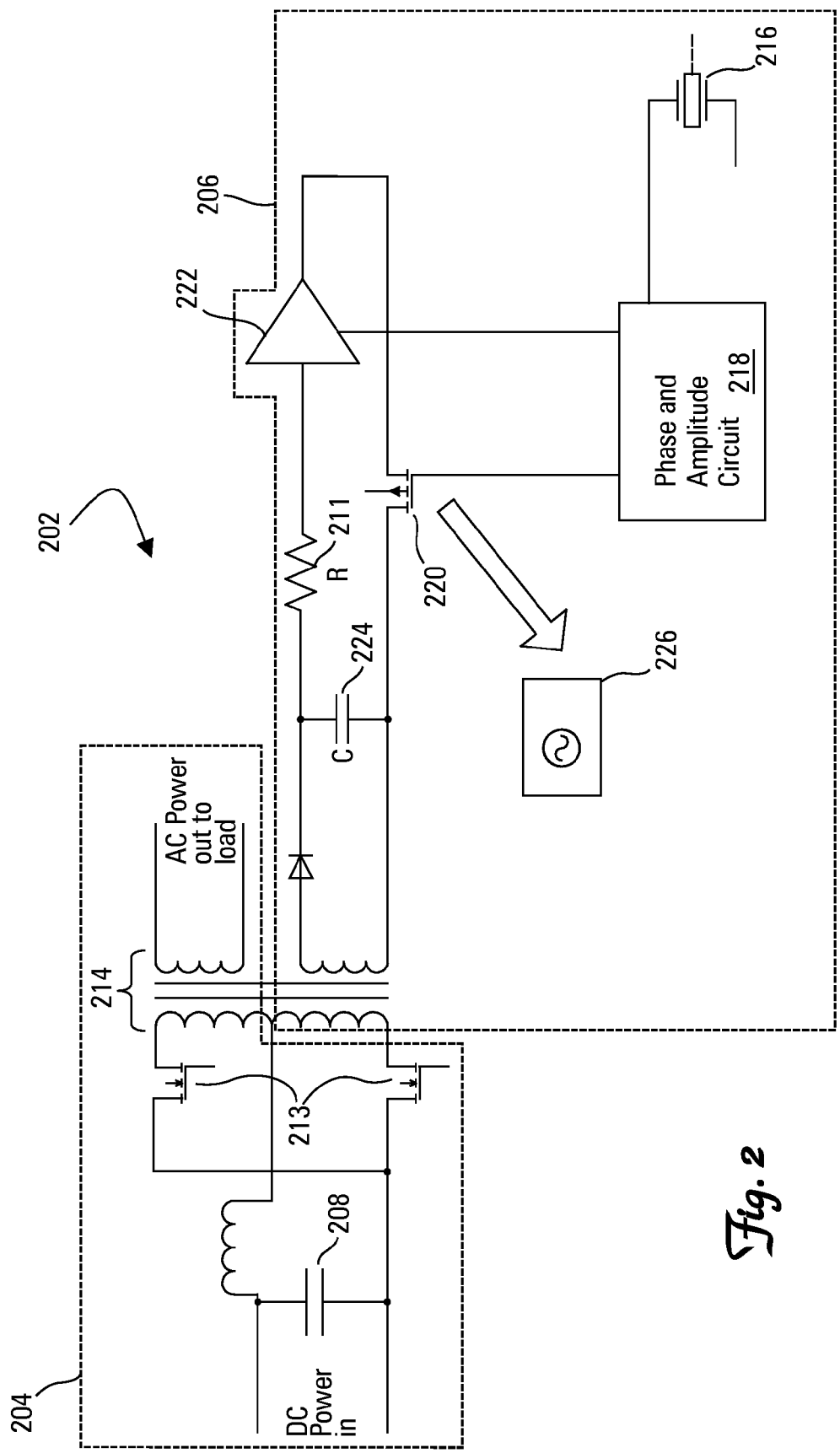
FIG. 2 is a block diagram of an acoustically quiet power converter according to one embodiment of the present invention.

FIG. 2 is a block diagram of an acoustically quiet power converter 202 according to one embodiment of the present invention. Power converter 202 includes a switch-mode converter circuit 204 and an auxiliary switching circuit 206. Auxiliary switching circuit 206 includes an RC circuit comprised of a capacitor 224 and a resistor 211. The RC circuit shapes voltage levels across the switch 220 as known to one of skill in the art. Switch 220 controls the storage and release of energy to produce a compensating acoustic signature in opposite phase with the switches 213 in converter circuit 204. In particular, the duty cycle of switch 220 and the control of the amplitude of the electric current through switch 220 determine the acoustic compensating effect of auxiliary switching circuit 206. As shown in FIG. 2, storage component 224 is a capacitor in this embodiment. However, it is to be understood that other suitable storage components, such as an inductor, are used in other embodiments. Similarly, switch 220, in this embodiment, is implemented as metal-oxide-semiconductor field-effect transistor (MOSFET). However, in other embodiments, other switches can be used such as insulated-gate bipolar transistors (IGBT).

Auxiliary switching circuit 206 is configured such that the duty cycle of switch 220 is approximately 180 degrees out of phase with switches 213 in converter circuit 204. That is, when switches 213 are open, switch 220 is closed and vice versa. In particular, sensor 216 detects one or more characteristics related to radiated acoustic noise from converter circuit 204. For example, in some embodiments, sensor 216 is a piezoelectric transducer configured to monitor the acoustic strength of radiated acoustic noise. In other embodiments, sensor 216 is a current sensor coupled to the load side of transformer 214 and configured to monitor electrical current output of converter circuit 204. By measuring current, a current sensor indirectly measures the strength of radiated acoustic noise due to the dependency of acoustic noise strength on the current in converter circuit 204.

Sensor 216 outputs the measured characteristic to phase and amplitude circuit 218 (also referred to as a control circuit). Based on inputs from sensor 216, phase and amplitude circuit 218 determines when to switch on/off switch 220 and the amount of current to provide to switch 220 in order to adjust the amplitude and phase of the acoustic signature produced by switch 220. In particular, op amp 222 responds to control signals from phase and amplitude circuit 218 in order to control current levels through switch 220. The acoustic signature produced by switch 220 is amplified via transducer 226 which is mechanically coupled to auxiliary switching circuit 206. Thus, vibrations from switch 220 are amplified by transducer 226 to cancel the radiated, acoustic noise from switches 213. Transducer 226 is a ceramic transducer in this embodiment. However, it is to be understood that any suitable transducer configured to acoustically amplify mechanical vibrations can be used in other embodiments.

In operation, switches 213 open and close according to their duty cycle to control the output voltage of transformer 214. When switches 213 are closed, capacitor 224 in auxiliary switching circuit 206 stores energy. When switches 213 are open, capacitor 224 releases the stored energy to provide current to auxiliary switching circuit 206. Sensor 216 detects and measures ambient acoustic noise and provides the measurement of detected noise to phase and amplitude circuit 218 which calculates the amount of current (e.g. to calculate amplitude) released through switch 220 and the open/close operation of switch 220 (e.g. to calculate phase). Switch 220 is mechanically coupled to transducer 226. Mechanical vibrations from switch 220 excite transducer 226 which amplifies the acoustic noise produced by the switching of switch 220. Since transducer 226 amplifies the acoustic noise, auxiliary switching circuit is able to operate at much lower power than converter circuit 204. Sensor 216 continuously monitors acoustic noise and provides feedback to phase and amplitude circuit 218 to adjust the amplitude and/or phase of the compensating acoustic signature produced by switch 220 such that its acoustic signature is substantially equal to and 180 degrees out of phase with the signature produced by switches 213. Therefore, auxiliary switching circuit 206 provides substantial reduction of the ambient noise.

Thus, auxiliary switching circuit 206 is a hardware-based device which substantially eliminates or reduces acoustic noise produced by the switching of switches 213. Auxiliary switch 206 does not require or use fast Fourier transform (FFT) algorithms or other complex procedures to cancel acoustic noise. Being hardware-based and not using complex procedures reduces the cost of implementing an auxiliary switching circuit 206. Furthermore, by using a low power auxiliary switching circuit, a high frequency converter can be used which reduces the size and weight of the power converter as described above.

Figure 3:
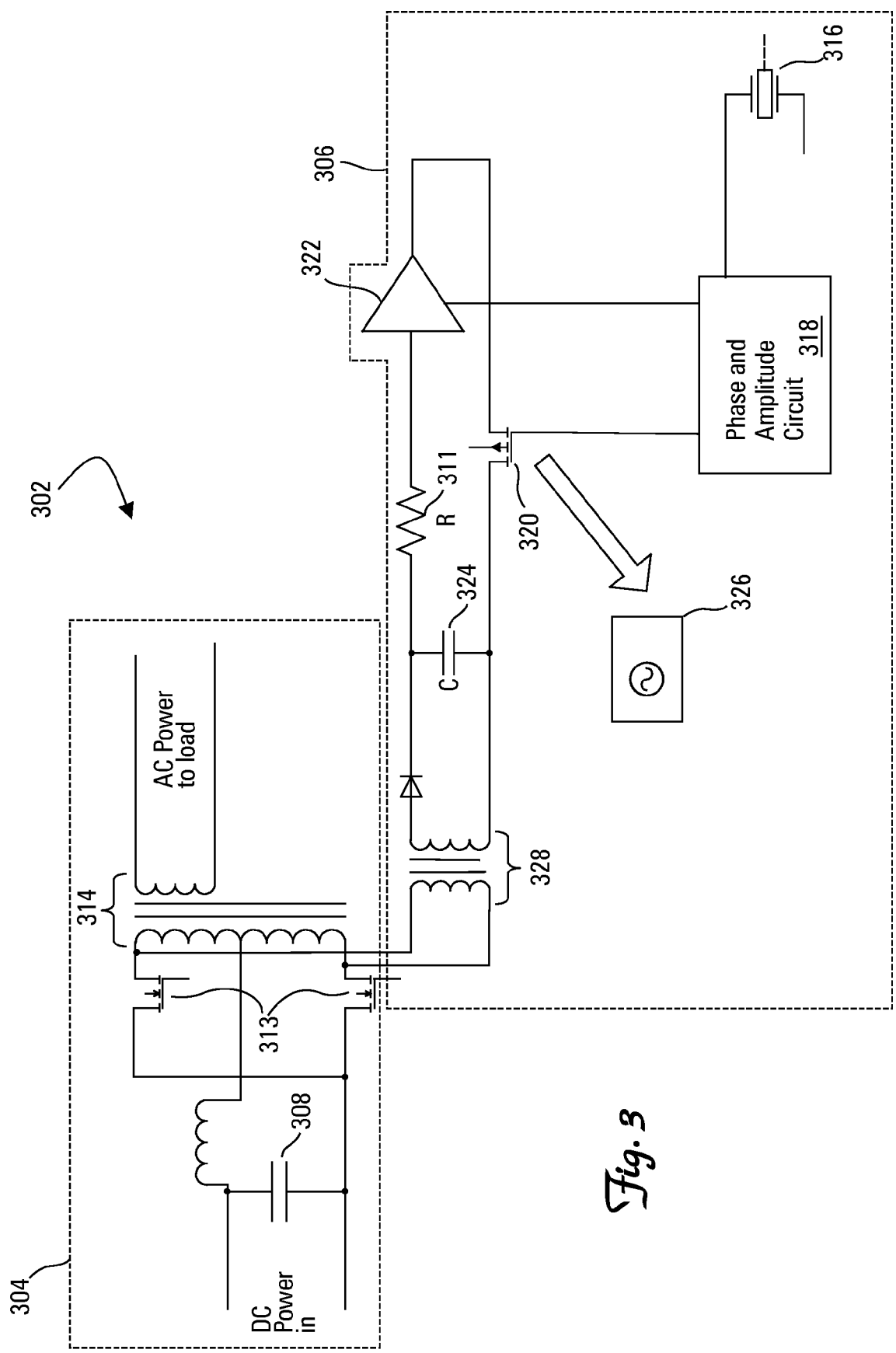
FIG. 3 is a block diagram of an acoustically quiet power converter according to another embodiment of the present invention.

Another hardware-based embodiment of an auxiliary switching circuit is shown in FIG. 3. In FIG. 3, auxiliary switching circuit 306 is not coupled to a secondary winding of storage component 314 as in power converter 202 in FIG. 2. Instead, auxiliary switching circuit 306 includes a separate transformer 328 which taps into the DC-power-in side of converter circuit 304. Separate transformer 328 enables auxiliary switching circuit 306 to be more easily coupled to an existing converter circuit than auxiliary switching circuit 206 which is integrated with a converter circuit through a secondary winding of storage component 214. However, auxiliary switching circuit 306 functions similar to auxiliary switching circuit 206. In particular, auxiliary switching circuit 306 radiates an acoustic signature which is approximately equal to and 180 degrees out of phase with radiated acoustic noise from switches 313 such that the radiated acoustic noise is substantially cancelled as described above.

Figure 4:
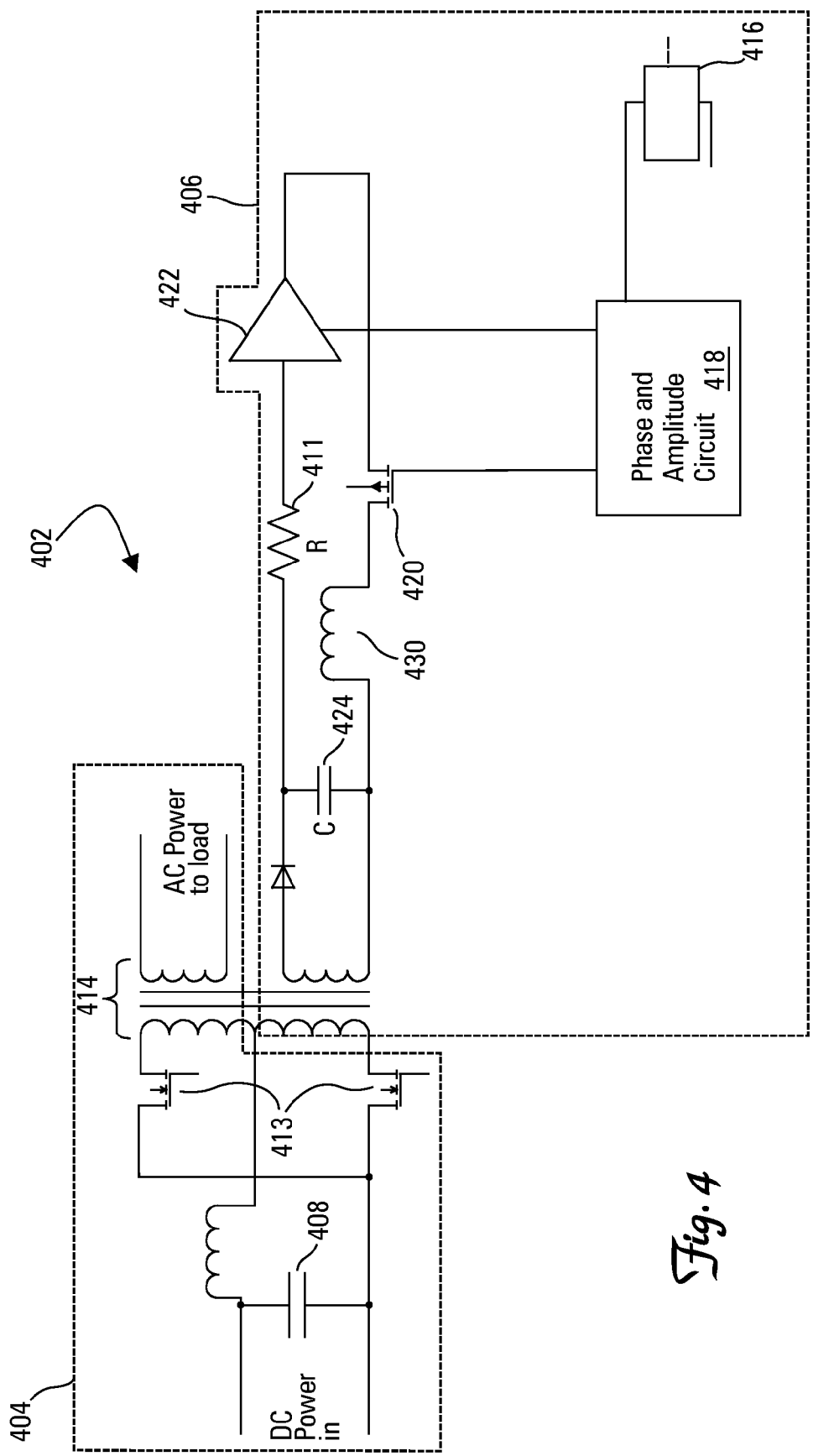
FIG. 4 is a block diagram of a power converter configured to cancel EMI produced by a magnetic field radiated by a converter circuit according to one embodiment of the present invention.

FIG. 4 is a block diagram of a power converter 402 configured to cancel EMI produced by a magnetic field radiated by converter circuit 404 according to one embodiment of the present invention. Auxiliary switching circuit 406 of power converter 402 is coupled to converter circuit 404 via a secondary winding of a storage component 414 as described above with respect to FIG. 2. Auxiliary switching circuit 406 operates similar to auxiliary switching circuit 206. However, auxiliary switching circuit 406 includes a coil 430 coupled to switch 420 rather than a mechanically-coupled transducer as in auxiliary switching circuit 206. Additionally, auxiliary switching circuit 406 includes a sensor 416 configured to detect the strength of a magnetic field rather than acoustic noise as in auxiliary switching circuit 206.

In operation, switches 413 open and close according to their duty cycle to control the output of power transformer 414. When switches 413 are closed, capacitor 424 in auxiliary switching circuit 406 stores energy. When switches 413 are open, the stored energy is released from capacitor 424 by the closure of switch 420 as controlled by the phase and amplitude circuit 418 to provide current to auxiliary switching circuit 406. Sensor 416 detects and measures the strength of the magnetic field radiated by storage component 414. Sensor 416 provides the magnetic field measurement to phase and amplitude circuit 418 which calculates the amount of current (e.g. amplitude) to provide to switch 420 and when to open/close switch 420 (e.g. phase). Coil 430, which is driven by switch 420, radiates a compensating magnetic field according to the duty cycle of switch 420 and the amplitude of the released current. In particular, since the duty cycle of switch 420 is approximately 180 degrees out of phase with switch 413, coil 430 radiates a compensating magnetic field that is equal to and 180 degrees out of phase with the magnetic field radiated from transformer 414. Magnetic coil 430 is oriented in space to provide optimal magnetic signature attenuation to the power converter 402. Sensor 416 continuously senses the strength of the magnetic field and provides feedback to phase and amplitude circuit 418 to adjust the amplitude and/or phase of the compensating magnetic field radiated by coil 430 such that the compensating magnetic field is maintained substantially equal to and 180 degrees out of phase with the magnetic field produced by transformer 414 as described above.

FIG. 5 is a method 500 of cancelling noise in a switch-mode power converter according to one embodiment of the present invention. Method 500 is implemented in a switch-mode power converter having an auxiliary switching circuit such as auxiliary switching circuit 206 of power converter 202 above. At 502, an auxiliary switch is switched at approximately 180 degrees out of phase with a switch in a converter circuit of the switch-mode power converter 202. That is, when the switch in the converter circuit is open, the auxiliary switch is closed and vice versa. At 504, energy for the auxiliary switching circuit is stored when the auxiliary switch is open. For example, a capacitor is used in some embodiments to store energy when the auxiliary switch is open. At 506, when the auxiliary switch is closed, the stored energy is released to the auxiliary switch. Releasing the stored energy provides current to the auxiliary switching circuit for producing compensating noise which cancels the noise radiated from the converter circuit.

At 508, one or more characteristics of noise radiated from the power converter are detected. The one or more characteristics include current provided to the switch in the converter circuit, amplitude of radiated noise, etc. as described above. At 510, the current to the auxiliary switch is modified to radiate compensating noise which substantially cancels the radiated noise from the converter circuit. In particular, in some embodiments, a phase and amplitude circuit (e.g. phase and amplitude circuit 218 in FIG. 2) provides controls to the auxiliary switch and an op amp for controlling the phase and amplitude of the compensating noise. In some embodiments, the compensating noise is acoustic noise which is amplified as described above to cancel acoustic noise from the switch in the converter circuit. In such embodiments, the phase and amplitude circuit is configured to calculate the amount of current needed to produce the desired amplitude of the compensating acoustic noise given the known amplification.

In other embodiments, the compensating noise is a magnetic field. In such embodiments, the phase and amplitude circuit is configured to control the amount of current through a coil to produce a magnetic field which cancels the magnetic field from the converter circuit given the known characteristics and spatial orientation of the coil. Method 500 returns to 508 to obtain feedback on any detected changes in the radiated noise. In this way, the switching of the auxiliary switch is maintained approximately 180 degrees out of phase with the switching of the switch in the converter circuit.

It is to be understood that although method 500 is presented in a serial fashion, two or more steps of method 500 can occur simultaneously in embodiments of the present invention. For example, energy released at block 506 can occur simultaneously as one or more characteristics of radiated noise are detected at 508.

Although specific embodiments have been illustrated and described herein, it will be appreciated by those of ordinary skill in the art that any arrangement, which is calculated to achieve the same purpose, may be substituted for the specific embodiment shown. For example, in one embodiment, when reduced performance can be tolerated, the auxiliary switching circuit can be operated without the transducer feedback and the phase and amplitude circuit. Therefore, the system is further simplified and reliability is improved. In one such embodiment, the amplitude of the current in the auxiliary switching circuit is fixed and synchronization is triggered by the switches in the converter. This application is intended to cover any adaptations or variations of the present invention. Therefore, it is manifestly intended that this invention be limited only by the claims and the equivalents thereof.

What is claimed is:

1. A switch-mode power converter comprising:
A converter circuit comprising:
a storage component configured to temporarily store input energy; and
at least one switch configured to control release of the stored energy from the storage component; and
an auxiliary switching circuit coupled to the storage component, the auxiliary switching circuit comprising an auxiliary switch having a duty cycle that is approximately 180 degrees out of phase with the duty cycle of the at least one switch in the converter circuit such that the auxiliary switching circuit produces compensating noise which substantially cancels noise radiated from the converter circuit.

2. The switch-mode power converter of claim 1, wherein the auxiliary switching circuit is configured to radiate acoustic noise which substantially cancels acoustic noise radiated from the at least one switch in the converter circuit.

3. The switch-mode power converter of claim 1, wherein the auxiliary switching circuit is configured to produce a magnetic field which substantially cancels a magnetic field radiated from the converter circuit.

4. The switch-mode power converter of claim 1, wherein the storage component in the converter circuit is one of a capacitor and an inductor.

5. The switched mode power converter of claim 1, wherein the converter circuit is configured for operation in one of a power supply, an alternating current (AC) inverter, a pulse width modulated motor controller, and a direct current to direct current (DC/DC) converter.

6. The switched mode power converter of claim 1, wherein the auxiliary switching circuit is a low power device.

7. The switch-mode power converter of claim 1, wherein the auxiliary switching circuit further comprises:
- a capacitor configured to store energy when the switch in the auxiliary switching circuit is open and to provide energy to the auxiliary switching circuit when the switch in the auxiliary switching circuit is closed;
- a sensor configured to detect one or more characteristics of radiated noise; and
- a control circuit configured to control current to the switch in the auxiliary switching circuit based on the one or more detected characteristics of the noise.

8. The switch-mode power converter of claim 7, wherein the auxiliary switching circuit further comprises a transducer mechanically coupled to the switch in the auxiliary switching circuit and configured to radiate acoustic compensating noise which substantially cancels acoustic noise radiated from the converter circuit.

9. The switch-mode power converter of claim 7, wherein the sensor is one of a piezoelectric sensor and a current sensor coupled to the at least one switch in the converter circuit to detect the converter load current.

10. The switch-mode power converter of claim 7, wherein the auxiliary switching circuit further comprises a coil coupled to the switch in the auxiliary switching circuit and configured to generate a magnetic field which substantially cancels a radiated magnetic field from the storage component in the converter circuit.

11. The switch-mode power converter of claim 7, wherein the auxiliary switching circuit further comprises a transformer which taps into a low voltage side of the converter circuit.

12. An auxiliary switching circuit comprising:
- a switch configured to switch open and closed;
- a capacitor configured to store energy when the switch is open and to provide energy to the auxiliary switching circuit when the switch is closed;
- a sensor configured to detect one or more characteristics of noise radiated by a switched mode converter circuit coupled to the auxiliary switching circuit;
- a control circuit configured to control current to the switch based on the one or more detected characteristics of the radiated noise such that the switch has a duty cycle that is approximately 180 degrees out of phase with a switch in the switched mode converter circuit; and
- a noise cancelling component coupled to the switch in the auxiliary switching circuit and configured to radiate compensating noise which substantially cancels the noise radiated from the switch-mode converter circuit.

13. The auxiliary switching circuit of claim 12, wherein the noise cancelling component is a transducer mechanically coupled to the switch in the auxiliary switching circuit and configured to radiate acoustic noise which substantially cancels acoustic noise radiated form the switch in the switch-mode converter circuit.

14. The auxiliary switching circuit of claim 12, wherein the noise cancelling component is a coil configured to generate a magnetic field which is substantially 180 degrees out of phase with a magnetic field generated by the switch-mode converter circuit.

15. The auxiliary switching circuit of claim 12, wherein the sensor is a piezoelectric transducer.

16. The auxiliary switching circuit of claim 12, wherein the sensor is a current sensor configured to measure the current through a switch in the switch-mode power converter.

17. The auxiliary switching circuit of claim 12, further comprising a transformer configured to tap into a low voltage side of the switched mode converter circuit.

18. A method of cancelling radiated noise in a switch-mode power converter, the method comprising:
- switching an auxiliary switch approximately 180 degrees out of phase with at least one switch in a switch-mode converter circuit;
- storing energy when the auxiliary switch is open;
- releasing the stored energy to the auxiliary switch when the auxiliary switch is closed;
- sensing one or more characteristics of noise radiated from the switch-mode converter circuit; and
- modifying current of the released energy based on the sensed one or more characteristics to radiate compensating noise which substantially cancels the noise radiated from the switch-mode converter circuit.

19. The method of claim 18, wherein sensing one or more characteristics comprises one of:
- sensing the amplitude of noise radiated from the switch-mode converter circuit; and
- sensing current levels to the switch in the switch-mode converter circuit.

20. The method of claim 18, wherein modifying current of the released energy to radiate compensating noise comprises one of:
- modifying current to radiate a magnetic field which substantially cancels a magnetic field radiated from the switch-mode converter circuit; and
- modifying current to radiate acoustic noise which substantially cancels acoustic noise radiated from the switch-mode converter circuit.

* * * * *